May 17, 1966     T. A. WOJCIK     3,251,134
APPARATUS FOR INSPECTING THE INTERIOR OF A TUBULAR MEMBER
Filed Dec. 11, 1961     4 Sheets-Sheet 1

May 17, 1966 T. A. WOJCIK 3,251,134
APPARATUS FOR INSPECTING THE INTERIOR OF A TUBULAR MEMBER
Filed Dec. 11, 1961 4 Sheets-Sheet 2
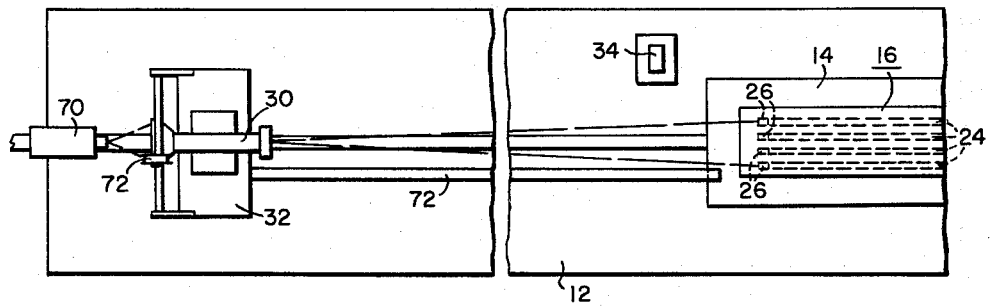
Fig. 7.
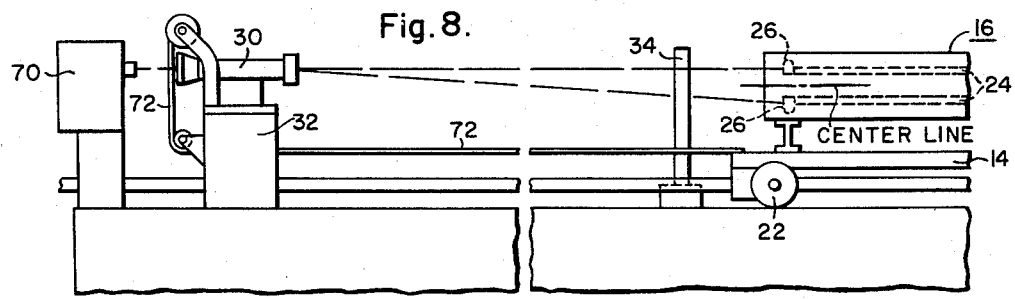
Fig. 8.
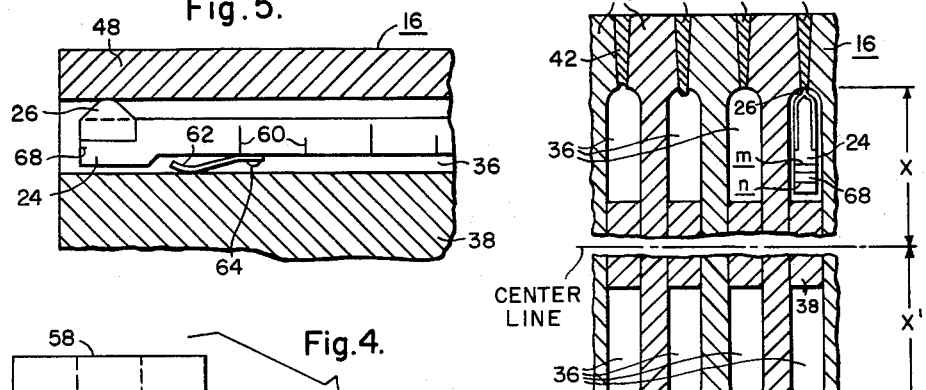
Fig. 5.
Fig. 3.
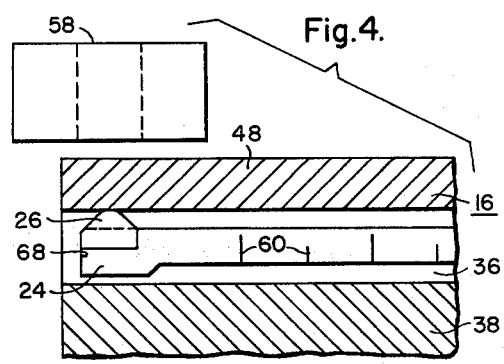
Fig. 4.
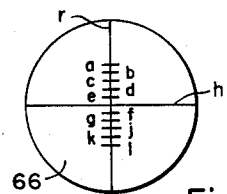
Fig. 6.

May 17, 1966 T. A. WOJCIK 3,251,134
APPARATUS FOR INSPECTING THE INTERIOR OF A TUBULAR MEMBER
Filed Dec. 11, 1961 4 Sheets-Sheet 3
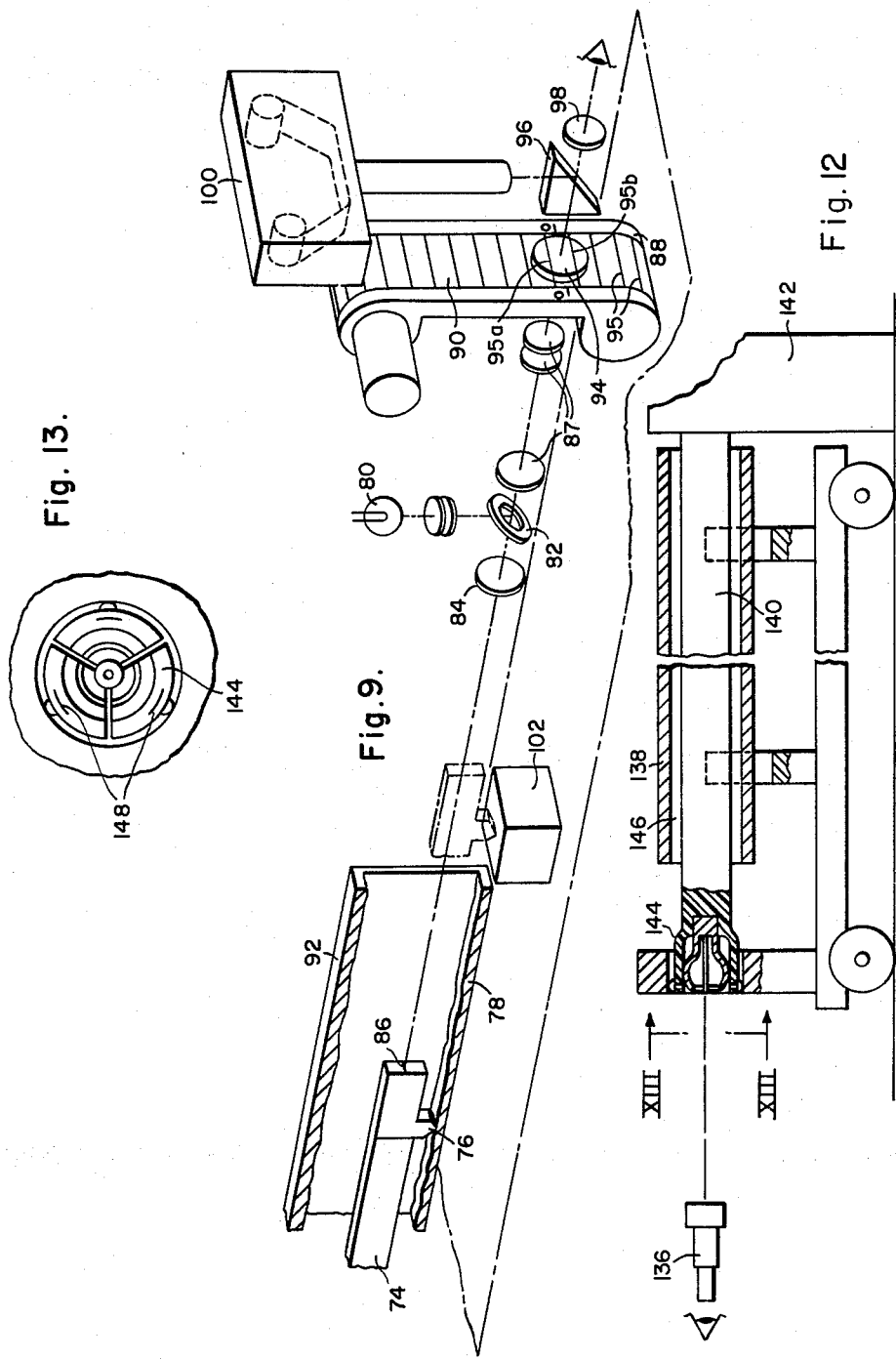

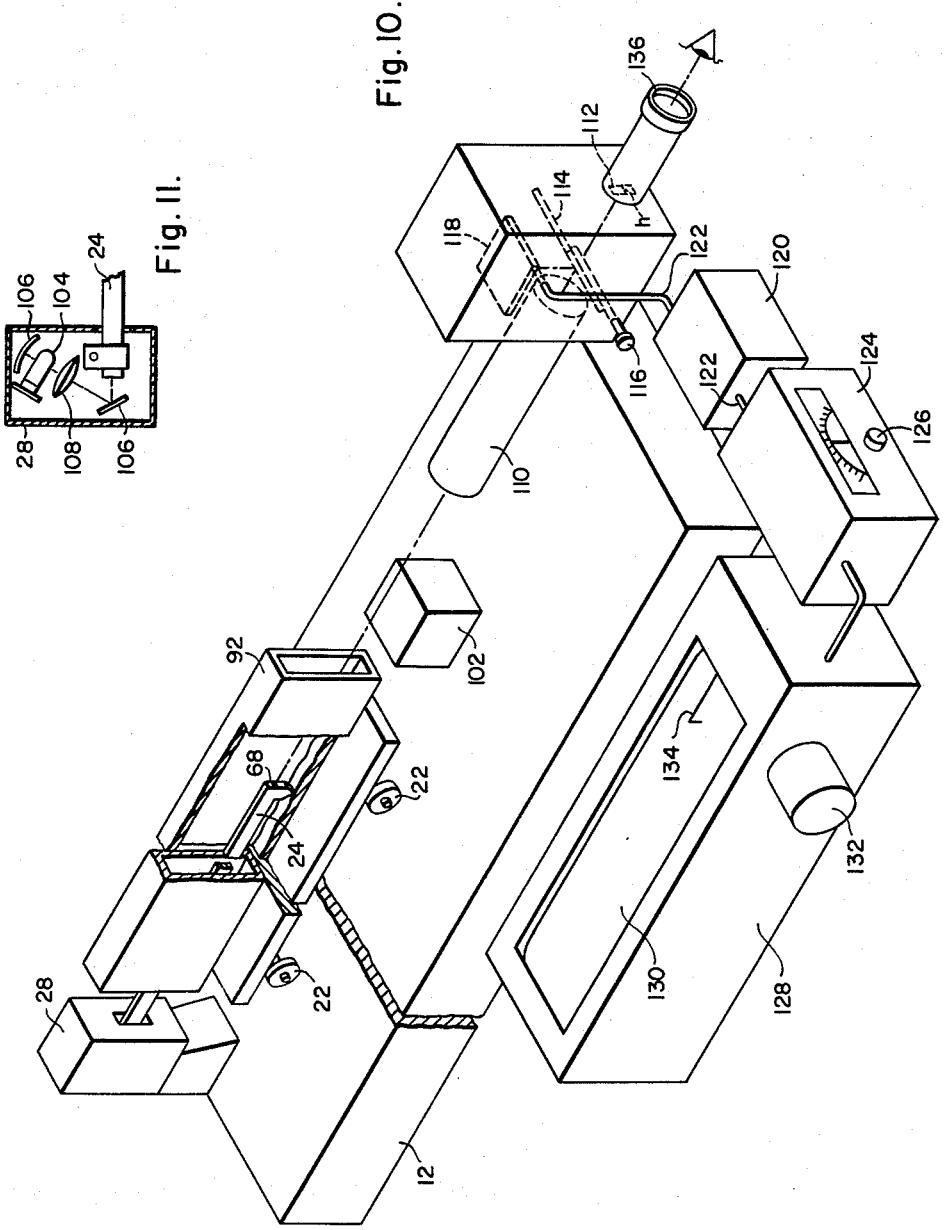

United States Patent Office 3,251,134
Patented May 17, 1966

3,251,134
APPARATUS FOR INSPECTING THE INTERIOR OF A TUBULAR MEMBER
Thaddeus A. Wojcik, Monroeville, Pa., assignor to Westinghouse Electric Corporation, East Pittsburgh, Pa., a corporation of Pennsylvania
Filed Dec. 11, 1961, Ser. No. 158,338
9 Claims. (Cl. 33—172)

The present invention is directed to measuring apparatus for determining the widths and other dimensions of interior, relatively inaccessible cavities and the like, and more particularly to apparatus for measuring over or under penetration of linear welds within elongated channel sections. More specifically, the invention is directed to an optical system for measuring weld penetration where material is contained within the channel of an elongated tubular member.

In tubular members wherein the member is formed by two or more channel-like sections spliced together by means of a longitudinal weld along the length of the joined sections, the measuring of over or under penetration of the weld along the joining portions or seam is critical because of problems that arise if certain tolerances are not adhered to in certain applications of such members. For instance, in over-penetration of the weld, interference with the material encased within the tubular member may occur. In under-penetration of the weld sufficient strength for securing the spliced portions together might not be obtained considering the stresses placed upon the tubular member when in use.

Such tubular or channel-like members with extremely critical tolerances of weld penetration often occur in nuclear reactor sub-assembly constructions. Prior to the present invention, measurement of minimum and maximum weld penetration of seams has been awkward as well as difficult. Only mechanical means of probing and reading measurements has been employed. Likewise, it has generally been impossible to probe more than one channel at a time with a single measuring device. In the type of tubular members used in reactor sub-assemblies, a spacer is generally contained within the hollow portion of each tubular member to aid in welding. Such a spacer had to first be removed before prior mechanical methods of measuring the weld penetration could be used. If an error was determined and re-welding had to take place the filler or spacer had to be re-inserted and then removed for further readings. In re-inserting the spacer, a loss of control of the channel size occurs because of the heating and re-heating required. The present invention by eliminating the necessity of removing the spacer before measuring not only saves the expense of placing more material in the channel if re-welding occurs but thus provides for better control on the channel size.

As will be evident herein, the invention is equally adaptable for measuring the widths of channels or bores, in general.

Accordingly, it is an object of the present invention to provide a more readily usable and efficient apparatus for measuring one or more interior dimensions of a closely confined aperture or cavity. More specifically an object is to arrange such apparatus for measuring weld penetration into such cavities.

Another object of the present invention is to provide an illuminated probe readable by optical instruments for recording and locating weld penetration and other defects when splicing together channel members.

It is a further object of the present invention to provide a combined optical and mechanical measuring apparatus for measuring weld penetration in a tubular member without first requiring the removal of a spacer or other filler located generally in a hollow portion of that tubular member.

Still another object of the present invention is to provide apparatus for taking measurements of a plurality of channel-like recesses simultaneously with a single reading instrument.

A still further object of the present invention is to provide in an apparatus for measuring the penetration of a welded seam, a probe held against the seam by a novel magnetic or resilient arrangement.

A further object of the present invention is to provide a novel measuring apparatus for welded joints which automatically records the location and depth of weld penetrations along a welded seam.

A still further object of the present invention is to provide a novel method of measuring a pair of seams disposed approximately 180° apart simultaneously, or a plurality of such seams, with a single measuring apparatus.

Still another object of the present invention is to provide a novel film reading and recording apparatus, providing an alternative visual reading, for measuring the location and depth of weld penetration of a longitudinal seam.

Briefly then, the present invention relates to measuring an interior dimension of a tubular member, for example a weld penetration along an elongated seam between spliced channels forming the tubular member, through the use of an optical instrument taking readings from an illuminated probe arm extending within said channel. The fixed distances from the recording instrument to a common bed which supports the probed tubular member is the determining factor measuring the variations and weld penetration. In accordance with the principles of the present invention, it is rendered possible to take readings from the probe arm through optical means directly by the human eye or through a camera or through an automatic recording instrument. The present invention further comprehends the possibility of taking simultaneously readings of a plurality of seams when the seams are disposed either in parallel and/or opposite from one another. The probe can be illuminated either by being translucent and receiving a light from its end opposite from the optical instrument or by being opaque and receiving light from a source intermediate said probe and said optical instrument. The probe can be held in position by either a snug fit within the channel opening or by magnetic, resilient, or other similar means. It is generally preferred that the tubular members being measured be the movable element in the apparatus so as to maintain a fixed focal length between the end of the probe and the viewing optical instrument. Where a camera is to be used for recording the weld penetration or other dimension, it is generally desired that a dimensional tape be placed near the end of the camera to photograph the actual distance the probe arm is within a channel or sub-assembly at the particular instant the camera is recording. When the opposite end of the channel is desired to be measured it is within the comprehension of this invention that either the channel member itself be turned 180° or that the measuring apparatus be rotated 180°.

The above and other objects, features and advantages of the invention will become more apparent upon consideration of the following detailed description of apparatus for measuring weld penetration incorporating various components constructed in accordance with the principles of the invention when taken in connection with the following drawings, in which:

FIG. 3 is a partial enlarged cross-sectional view of a welded tubular member taken substantially along the reference line III—III of FIG. 2;

FIG. 4 is a cross-sectional illustration partially along the length of one of the longitudinal channels of FIG. 3 containing the probe arm therein;

FIG. 5 is a view similar to FIG. 4 only showing a modified form of probe arm;

FIG. 6 is a front view of a typical scope lens used in the apparatus of FIG. 1;

FIG. 7 is a partial top plan view of a modified measuring apparatus;

FIG. 8 is a side elevational view of the apparatus shown in FIG. 7 with portions thereof broken away;

FIG. 9 is a partial isometric view of another modified form of the present invention;

FIG. 10 is a partial isometric view of still another modified form of the present invention;

FIG. 11 is a partial cross-sectional view of a part of the measuring apparatus of FIG. 10;

FIG. 12 is a partial cross-sectional view of still another modified form of the measuring apparatus of the present invention.

FIG. 13 is an end elevational view showing the measuring apparatus of FIG. 12 and taken along reference line XIII—XIII thereof.

Figure 1:
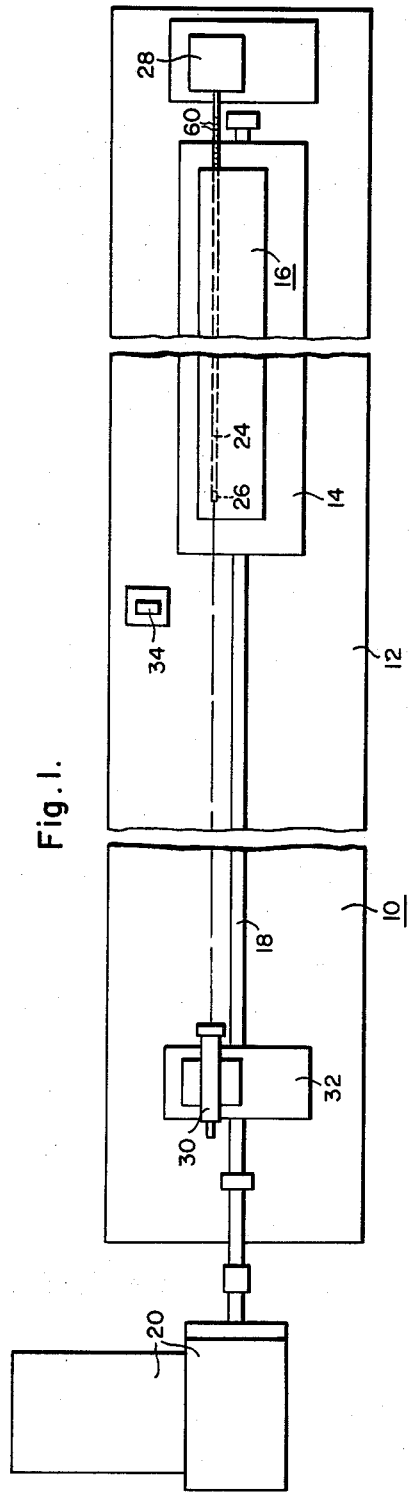
FIGURE 1 is a top plan view of a measuring apparatus constructed according to the principles of the present invention.
Figure 2:
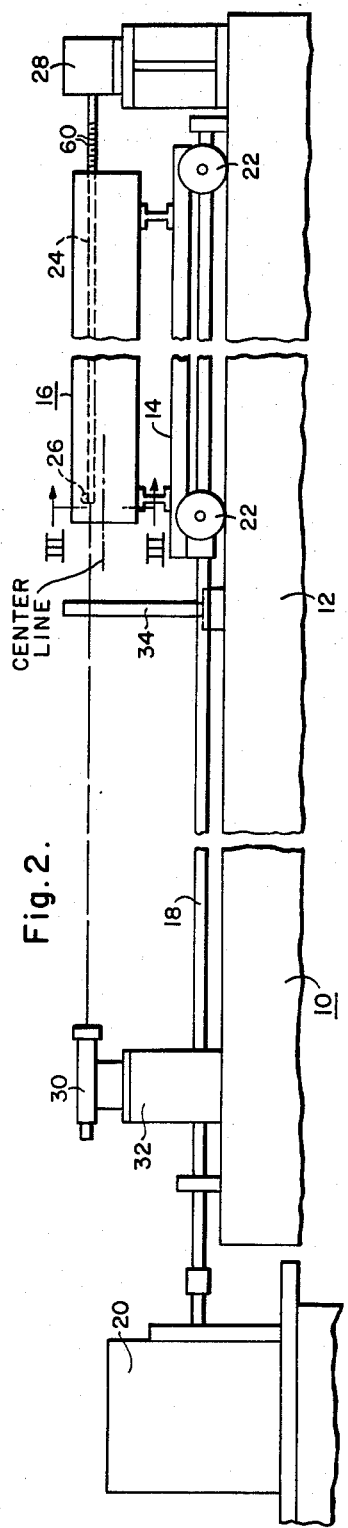
FIG. 2 is a side elevation view of the apparatus as seen in FIG. 1, with portions thereof broken away.

Referring more particularly to FIGS. 1 and 2, it can be seen that the weld measuring apparatus 10 of the present invention includes a bed or floor 12 upon which a movable carriage 14 supports tubular section or sub-assembly member 16 which is to be inspected. The carriage 14 is movable along the bed 12, as here illustrated, by a shaft 18 interconnected with a variable speed drive 20 such as a "Graham Drive" for example. The particular expedient used in moving the carriage can be any other well known means, as desired, it not necessarily comprising the particular driving means shown. For purposes of expediency, the carriage 10 contains wheels 22 for rolling the carriage 14 along the bed 12.

Preferably a light transmitting probing rod or strip 24 formed for example from Plexiglas is adapted to be inserted within the channels of the sub-assembly 16. At its probing end the rod 24 includes a follower tip end 26 for engaging the weld seam, the tip being preferably of steel or other equivalent metal and being ground to form a knife edge. The details of this probing operation will be described in more detail later. The end of the Plexiglas rod opposite the tip 26 should be inserted into a light source box 28 with preferably any suitable light source, as for example a 100 watt lamp, projecting light into the end of the rod 24 directly to illuminate a scribe line, to be described later, at the probing tip end of the rod 24. It is generally desirable that the light source box 28 be provided with some convenient form of lateral adjustment so that the probe arm 24 can be moved into channels laterally spaced along a single sub-assembly.

An optical scope 30, laterally adjustable upon a support 32, is located on the side of the sub-assembly opposite from said light source box 28. The reason for having the scope 30 adjustable laterally on the supporting member 32 is to allow for alignment with the rod 24 in any one of a plurality of lateral positions along a sub-assembly 16 (FIG. 3). A height scale 34 is also located on the bed 12 to establish a fixed relationship between the height of the end of the rod 24 and the sub-assembly 16 with respect to the scope 30.

As illustrated in FIG. 3, it can be seen that the sub-assembly 16 contains a plurality of hollow or channel sections 36 in which is located a spacer 38 which takes up the entire area of the hollow 36 except near the top and bottom of the hollows. In nuclear sub-assemblies such spacer is usually formed from a mild steel such as the material sold under the trade name Ti-Namel. The hollows 36 can be formed from I-beam or channel sections 40 being spaced closely together and aligned at their tops and bottoms and joined by welds 42, 44, 46, 48, 50, 52, 54 and 56 as illustrated in FIG. 3. It can be seen, for example, that welds 42 and 54 are illustrations of under-penetration and welds 44 and 50 are illustrations of over-penetration. It would appear from FIG. 3 that welds 46, 48, 52 and 56 are apparently satisfactory. It can also be seen that in the right-handmost channel 36 that a probe rod 24 is located therein and that the blade tip 26 engages the bottom of the weld 48 in a tracing arrangement. This is also clearly illustrated in FIG. 4, for example.

To keep the tip 26 on the weld 48 (FIG. 4) a capacitance type of coil magnet 58, or its equivalent, can be used with a pull of approximately 30 to 50 pounds, such that it will lift the steel tip within the sub-assembly 16 against the bottom wall of the weld 48 from outside of the sub-assembly 16. The pull of the magnet 58 can be controlled by a voltage regulator (not shown) to eliminate heavy drag. The magnet 58 must have a lateral adjustment as does the scope 30 and light source box 28 to position it above each individual channel 36 as its respective weld is measured. This can be accomplished by any convenient positioning means (not shown).

Graduations 60 are located along the length of the probing rod 24, also see FIGS. 1 and 2, so that it can be told from the outside end of the rod 24 nearest the light source box 28 the inward extend of the probe tip 26 within the sub-assembly 16 so as to pinpoint the measurement being taken at any one particular time.

FIG. 5 illustrates a modified arrangement where instead of a magnet 58 a resilient spring 62 is attached to the bottom of a probe rod 24 by any suitable means such as a screw 64, the spring being used to keep the tip 26 bearing against the bottom wall of the weld 48. The resilient spring 62 is biased against the top wall of the spacer 38 with sufficient enough force to permit the tip 26 to bear firmly against the bottom wall of the weld 48 yet to travel along that weld as the sub-assembly 16 is moved longitudinally along the length of the bed 12.

To determine the proper amount of weld penetration the distance from the center line of the sub-assembly 16 to the penetrating end wall of any given weld for ideal penetration can be calculated and is generally a constant figure. Thus in viewing FIG. 3 the distance X and X' would be considered as the proper amount of penetration of the weld assembly of the welds 48 and 56. Of course, it is understood that certain tolerances are permissible. The scope 30 contains a lens 66 (FIG. 6) which is arranged so as to cooperate with a scribe line 68 (FIG. 3) for measuring purposes. Scribe line 68 can be an etching across the end of the Plexiglas rod 24 which is filled with black printer's ink such that when the light source on the box 28 projects through the rod the end of the rod is completely illuminated around the black line 68 so as to make it predominant.

The lens 66 is used to determine the distance from the zero-zero or $h$ line on the scope lens 66 with respect to the center line of the sub-assembly 16. The center line of the sub-assembly is a practical base from which to measure the maximum and minimum weld penetration. The scope 30 is adjusted vertically with respect to the minimum and maximum tolerance with reference to the zero-zero line of the lens 66. The arrangement is made such that the zero-zero line is half way between the minimum and maximum permissible allowance of weld penetration. For example, in measuring the top weld penetration suppose the minimum can be 3¼" away from the center line and the maximum weld penetration can be 3" away from the center line. Let us read line $b$ as the 3¼" dimension and the line $k$ as the 3" penetration. This means that the zero-zero or H line of the scope 66 would be located at a point 3⅛" from the center line as determined by use of the optical scale 34 since it can be determined what the distance of the center line of the sub-assembly is from the table bed upon which the height scale 34 is placed. It, of course, is assumed that the distance from the lens center line to the table bed is constant and that the table bed 12 is level.

It can thus be seen that as the sub-assembly moves along the probe 24, when the scribe line 68 stays within the boundaries of the line b and k that the minimum and maximum amount of penetration will not have been exceeded. However, if the scribe line 68 travels upward, for instance on the lens 66, to the line a the penetration of the weld 48 would be too small (as shown in weld 42, for example). If it is desired to determine exactly how much each individual weld is, the graduations a, b, c, etc., can be given specific numerical values and as the probe rod 24 moves through the space 36 readings can be taken through the scope and coordinated with the graduations 60 along the length of the scope to determine exactly what any given penetration is at a specific point within the hollow of the sub-assembly 16.

The above-described method of measuring will be appropriate for measuring any of the top welds 42, 44, 46 and 48, for example. If it is desired to measure the bottom welds 50, 52, 54 and 56, it is only necessary to rotate the sub-assembly 16, half way around from its position as shown in FIGS. 1 and 2 so that the bottom welds are on top.

It is noted that since the sub-assembly 16 is the only traveling element that the distance between the scope lens 66 and the scribe line 68 is constant to give consistent readings due to the fixed focal length achieved. To measure subsequent channels 36 in any one particular sub-assembly, it is only necessary to move the optical components, that is the scope 30 and the light source box 28 containing the probe 24 laterally with respect to the sub-assembly 16 for the various channels. Of course, if the magnet 58 is used that will have to be moved laterally also.

It is noted that it is within the contemplation of the present invention that if the bottom welds are desired to be measured after the top welds of the sub-assembly as described above, that it would be possible to rotate the probe arm 24 instead of rotating the sub-assembly if it was desired not to disturb the optical system. Also, it is possible that the sub-assembly could be moved laterally rather than moving the scope or light probe to obtain the readings as desired. Additionally, if the steel tip 26 were in a downward position it would be possible to merely drag the tip through the channel 36, as illustrated in FIG. 9 to be described later, without the necessity for a spring bias or magnet therefor. However, in the arrangement illustrated in FIGS. 3 to 5, it is definitely advantageous to use a biasing means such as the spring 62 or magnet 58. It is within the contemplation of the present invention that the graduation on the lens 66 probe 24 could be reversed and obtain approximately the same function. That is, if the lens 66 only contains a zero-zero line, line h, and the probe contained not only the scribe line 68 but a minimum line m and a maximum line n, then it can be seen that as long as the h line of the scope remains within the boundaries of the m and n lines on the probe then the weld penetration is satisfactory. As soon as the line m passes below the line h of the lens 66 or the line n passes above the graduation h then an unsatisfactory weld condition has been located.

In the modification of the invention as shown in FIGS. 1 and 2 as above described, it is necessary for an individual observer to view the readings of the scope 30 so that only a single channel 36 can be viewed at one time. However, it is within the contemplation of the present invention that a plurality of channels 36 can be viewed and the weld penetration thereof measured simultaneously. Thus, there is shown in FIGS. 7 and 8, a plurality of probing arms 24 simultaneously engaged in the sub-assembly 16. There is not only a plurality of probe arms in a lateral direction but also in a vertical dimension so that simultaneously the top and bottom weld penetration can be measured in any single channel or plurality of channels 36. Although four such probe rods are shown in FIG. 7, it is to be clearly understood that any number of channels can be viewed at one time, not being limited to four but being limited only by the range of the scope and other recording instruments.

Since it is impractical for an individual observer to observe so many penetrations simultaneously, it is further within the contemplation of this invention to substitute for the individual observer, using the naked eye, a camera 70 for recording the information received by the lens of the scope 30. With respect to the arrangement shown in FIGS. 7 and 8, it is desirable that the lens 66, as previously described, be replaced with a special wide angle lens that would magnify the image many times. Thus, the camera 70 can record the readings as viewed through the lens from a probe or probes 24 while a sub-assembly 16 is traveling along the bed 12. It is desirable to use a dimensional tape 72, preferably intermediate the scope 30 and camera 70, which is translucent so that the camera can view through the tape into the scope and coordinate the distance of travel of the sub-assembly along the probe arm and tip 26. The dimensional tape 72 would be synchronized with the carriage movement along the bed 12.

There is illustrated in FIG. 9 a modification of the present invention somewhat similar to that described in FIGS. 7 and 8, that is, with a camera recording device. In this instance, however, a probe arm 74 is made of a metallic spring steel, or its equivalent, and is biased downwardly so as to move the weld engaging tip 76 along the weld bead 78 while staying in snug engagement therewith. In this instance since the probe arm 74 is opaque, light cannot be transmitted through the arm but must be transmitted to it from in front of the arm intermediate between the channel and the viewing apparatus.

Thus, a light source 80 permits rays to pass through the angularly tilted optical piece 82 which directs its rays through the lens 84 to the scribe line 86 on the end of the probe 74. The rays are then returned back through the lens 84, 82 and 87 to be received through the distance measuring device 88. The device 88 has a movable tape 90 synchronized with the travel of the assembly 92 so that direct information as to the distance the probe arm 74 is within the assembly 92 can be readily seen. The lens 94 in the device 88 is set so that the zero-zero line is in a position similar to the line h in the lens 66 of a scope as employed in FIGS. 7 and 8, for example. Thus, when the scribe line 86 is seen to be adjacent with the zero-zero line of the measuring device 88 and within corresponding lines 95 on either side of the zero line, for example lines 95a and 95b, the weld penetration is within the permissible limits. A ninety degree, or half prism 96 is employed so that half of the tape and half of the scribe line and boundary lines are visible to an operator through a microscope eyepiece 98 for preliminary alignment and adjustment purposes or at any other desired time. The half prism will reflect the other half of the scribe line image, the boundary planes and the tape measurement directly to the camera 100 which preferably contains a magnifying lens (not shown) which greatly magnifies the half image, boundary planes, and linear increments recorded. In this arrangement, a master height block 102 is employed to perfectly align the scribe line 86 with the zero-zero line of the device 88 prior to the sub-assembly entrance over the probing arm 74. This is an alternate method to that used by the optical height scale 34 in FIGS. 7 and 8 for example.

It can be seen that a camera of the type described in FIGS. 7 to 9 which can view the weld penetraton in many channels simultaneously has distinct advantages over the type of arrangement shown in FIGS. 1 and 2 which require an operator to examine each individual channel separately, the camera arrangement is even superior in this sense over systems employing tape recording equipment which can view only one channel at a time because of the limitation of the recording apparatus. This is particularly advantageous in that the recording apparatus used in measuring such apparatus is relatively much more expensive than the camera arrangement employed in FIGS. 7 through 9, for example.

However, the present invention can be readily adapted to a tape recorder arrangement, such as illustrated in FIG. 10, for example. In this arrangement a channel 92 is being measured by use of an illuminated probe arm 24 and illuminator box 28, similar to that employed in FIG. 1. This illuminator is shown in more detail in FIG. 11 illustrating a light source 104 and reflecting mirrors 106 for transmitting the light through the lens 108 into the end of the probe rod 24. A gauge block 102 is again used as a permanent height block for all channels, thus establishing a relationship between the scribe line 68 to the center line of the assembly 92. Again this is an instance of a movable carriage with the focal length between the end of the proble 24 and the scope 110 being fixed. It is important in this particular modification especially to keep the focal length, and thus the image screen on the end of the proble arm 24, constant to eliminate re-calibrating and adjusting. The telescope 110 in this instance, however, is a collimating type embracing an aligning reticle 112 containing the zero-zero line $h$ like that employed in the lens 66 of FIG. 6.

A rotating indexing mirror 114 is contained within the scope apparatus for reasons later explained. The mirror is rotated by means of the knob 116. A light sensitive plate 118 is employed for receiving light rays from the mirror 114 and converting them into electrical impulses to be received by an impulse amplifier 120 through the electric conducting means 122. A calibrator 124 located in series with the amplifier 120 through wire lead 122 is a receiver which contains a milliamp current directing needle on a dial which, by the use of a knob control 126, can adjust the needle to a zero position regardless of the amount of current amplified. The calibrator 124 thus visually indicates by calibration minimum and maximum weld penetration and, will also send this information to a chart recorder 128. The recorder 128 carries a chart 130 and includes a synchronous motor 132 for moving the chart 130 at the same speed as the carriage 92 during examination. An indicating needle 134 is directed by the caliber output 124.

In the operation of the apparatus of FIG. 10, after the observer adjusts the scribe center line 68 through the lens 136 within the boundary plane indicating a zero-zero position on the aligning reticle 112, the mirror knob is turned approximately 45° with respect to the horizontal to project an image on the light sensitive plate 118. Due to the collimating type scope 110, only half of the image is on the plate, with the other half off of the plate 118. Additional plates like 118 can be employed to improve sensitivity if desired. The impulse received from the amount of light transmitted by the mirror 114 upon the plate 118 is thus amplified and calibrated so that the recorder needle 134 is at zero position. The carriage and recorder chart then moves simultaneously and as the part 92 moves forward for inspection the tracer arm 24 follows the bottom weld of the channel, moving up and down following the irregular contour of the weld path. Thus, the tracer arm transmits a certain amount of light on the light sensitive plate 118 which the recorder then measures on the chart 130.

The principles of the present invention can be employed for measuring many different types of channels such as for example a rifle barrel or other hollow member. In FIG. 12 a scope 136, similar to the scope 30 previously described, is employed to measure a barrel 138. In this instance the light transmitting probe 140, connected to an illuminating box 142, contains a plastic or other light transmitting plug 144 at its probing end which snugly fits the inner cavity 146 of the rod 138 at its extremes. Scribe line 148 is used in the same manner as is the scribe line above described and is coordinated with the zero-zero line of the lens in the scope 136 for direct reading.

Thus, it can be sen that the present invention includes within its concepts many variations for efficiently and accurately measuring the minimum and maximum weld penetration in channel or other subassembly. Since it is obvious that the invention can be embodied in other forms and constructions within the spirit and scope of the invention, as would be apparent to one skilled in the art, it is to be understood that the particular forms shown are but a few of such embodiments. According, with various modifications and changes being possible, the invention is not limited in any way with respect thereto. Moreover, it is to be understood that certain features of the invention can be employed without a corresponding use of other features thereof.

Accordingly what is claimed as new is:

1. Measuring apparatus for elongated tubes, said apparatus comprising an elongated bed portion, a carriage movable along a length of said bed portion, means for supporting said tubes on said carriage in a parallel fashion, elongated probe means mounted for simultaneous entry into said tubes adjacent one end of said bed portion, an optical instrument mounted adjacent the other end of said bed portion and located generally opposite said probe means for reading deflections thereof as the probe means travels through said tubes, means mounted adjacent the other end of said bed portion on the side of said optical instrument opposite from said probe means for recording permanently the readings of said instrument, and graduated tape means attached to said movable carriage and located intermediate said recording means and said instrument for coordinating the deflection readings of said probe means with their location within said tube.

2. Measuring apparatus for elongated tubes, said apparatus comprising an elongated bed portion, a carriage movable along the length of said bed portion, means for supporting said tubes on said carriage in a parallel fashion, elongated probe means mounted for simultaneous entry into said tubes adjacent one end of said bed portion, an optical instrument mounted adjacent the other end of said bed portion and located generally opposite said probe means for reading deflections thereof as the probe means travels through said tubes, a camera mounted adjacent the other end of said bed portion on the side of said optical instrument opposite from said probe means for recording the readings of said instrument, and graduated tape means attached to said movable carriage and located intermediate said camera and said instrument for coordinating the deflection readings of said probe with their location within said tube.

3. Measuring apparatus for elongated tubes, said apparatus comprising an elongated bed portion, a carriage movable along a length of said bed portion, means for supporting said tubes on said carriage in a parallel fashion, elongated probe means mounted for simultaneous entry into said tubes adjacent one end of said bed portion, an optical instrument mounted adjacent the other end of said bed portion and located generally opposite said probe means for reading deflections thereof as the probe means travels through said tubes, a half prism means in said instrument for splitting the image of said probe means in two directions, a camera mounted adjacent the other end of said bed portion on the side of said optical instrument opposite from said probe means for recording the readings of said instrument, and graduated tape means attached to said movable carriage and located intermediate said camera and said instrument for coordinating the deflection readings of said probe with their location within said tube, said camera taking its readings from one direction of said prism, and an eyepiece on said instrument for taking readings from the other direction of said prism in said instrument.

4. Measuring apparatus for an elongated tube, said apparatus comprising an elongated bed portion, a carriage movable along a length of said bed portion, means for supporting said tube on said carriage, an elongated resilient metallic probe mounted for entry into said tube adjacent one end of said bed portion, said probe disposed for biasing against an inner surface of said tube, an optical instrument mounted adjacent the other end of said bed portion and located generally opposite said probe for reading deflections thereof as the probe travels through said tube, and a light source and lens combination located generally intermediate the entry end of said probe and said optical instrument directing light to said entry end of the probe for illuminating that end thereof.

5. Measuring apparatus for an elongated tube, said apparatus comprising an elongated bed portion, a carriage movable along a length of said bed portion, means for supporting said tube on said carriage, elongated probe means mounted for entry into said tube adjacent one end of said bed portion, an optical instrument mounted adjacent the other end of said bed portion and located generally opposite said probe means for reading deflections thereof as the probe means travels through said tube, means mounted adjacent the other end of said bed portion on the side of of said optical instrument opposite from said probe means for recording permanently the readings of said instrument, and graduated tape means attached to said movable carriage and located intermediate said recording means and said instrument for coordinating the deflection readings of said probe means with their location within said tube.

6. Measuring apparatus for an elongated tube, said apparatus comprising an elongated bed portion, a carriage movable along the length of said bed portion, means for supporting said tube on said carriage, elongated probe means mounted for entry into said tube adjacent one end of said bed portion, an optical instrument mounted adjacent the other end of said bed portion and located generally opposite said probe means for reading deflections thereof as the probe means travels through said tube, a camera mounted adjacent the other end of said bed portion on the side of said optical instrument opposite from said probe means for recording the readings of said instrument, and graduated tape means attached to said movable carriage and located intermediate said camera and said instrument for coordinating the deflection readings of said probe means with their location within said tube.

7. Measuring apparatus for an elongated tube, said apparatus comprising an elongated bed portion, a carriage movable along a length of said bed portion, means for supporting said tube on said carriage, elongated probe means mounted for entry into said tube adjacent one end of said bed portion, an optical instrument mounted adjacent the other end of said bed portion and located generally opposite said probe means for reading deflections thereof as the probe means travels through said tube, a half prism means in said instrument for splitting the image of said probe means in two directions, a camera mounted adjacent the other end of said bed portion on the side of said optical instrument opposite from said probe means for recording the readings of said instrument, and graduated tape means attached to said movable carriage and located intermediate said camera and said instrument for coordinating the deflection readings of said probe means with their location within said tube, said camera taking its readings from one direction of said prism means, and an eyepiece on said instrument for taking readings from the other direction of said prism means.

8. Measuring apparatus for an elongated tube, said apparatus comprising an elongated bed portion, a carriage movable along a length of said bed portion, means for supporting said tube on said carriage, elongated probe means mounted for entry into said tube adjacent one end of said bed portion, an optical instrument mounted adjacent the other end of said bed portion and located generally opposite said probe means for reading deflections thereof as the probe means travels through said tube, a half prism means in said instrument for splitting the image of said probe means in two directions, means mounted adjacent the other end of said bed portion on the side of said optical instrument opposite from said probe means for permanently recording the readings of said instrument, and graduated tape means attached to said movable carriage and located intermediate said recording means and said instrument for coordinating the deflection readings of said probe with their location within said tube, said recording means taking its readings from one direction of said prism means, and an eyepiece on said instrument for taking readings from the other direction of said prism means.

9. Measuring apparatus for an elongated tube, said apparatus comprising an elongated bed portion, a carriage movable along a length of said bed portion, means for supporting said tube on said carriage, elongated probe means mounted for entry into said tube adjacent one end of said bed portion, an optical instrument mounted adjacent the other end of said bed portion and located generally opposite said probe means for reading deflections thereof as the probe means travels through said tube, a half prism means in said instrument for splitting the image of said probe means in two directions, means mounted adjacent the other end of said bed portion on the side of said optical instrument opposite from said probe means for permanently recording the readings of said instrument, said recording means taking its readings from one direction of said prism means, and an eyepiece on said instrument for taking readings from the other direction of said prism means.

References Cited by the Examiner

UNITED STATES PATENTS

| 1,206,502 | 11/1916 | Bennett | 33—172 |
| 2,159,035 | 5/1939 | McGrath | 33—17 |
| 2,198,837 | 4/1940 | Morgan | 33—46.2 |
| 2,659,563 | 11/1953 | Saxe | 177—79 |

FOREIGN PATENTS 826,695  1/1960  Great Britain.

ISAAC LISANN, *Primary Examiner.*

R. P. WILLIAMS, G. M. GRON, B. A. DONAHUE,
*Assistant Examiners.*